May 31, 1960 C. PAPPAZOGLU 2,938,958

SYSTEM FOR SETTING TELECOMMUNICATION SWITCHES BY MARKING

Filed June 5, 1956 6 Sheets-Sheet 1

INVENTOR
CONSTANTIN PAPPAZOGLU
BY Paul M. Craig, Jr.
ATTORNEY.

May 31, 1960 C. PAPPAZOGLU 2,938,958

SYSTEM FOR SETTING TELECOMMUNICATION SWITCHES BY MARKING

Filed June 5, 1956

6 Sheets-Sheet 2

INVENTOR
CONSTANTIN PAPPAZOGLU

BY Paul M. Craig Jr.
ATTORNEY.

May 31, 1960 C. PAPPAZOGLU 2,938,958

SYSTEM FOR SETTING TELECOMMUNICATION SWITCHES BY MARKING

Filed June 5, 1956

6 Sheets-Sheet 3

INVENTOR
CONSTANTIN PAPPAZOGLU
BY Paul M. Craig Jr.
ATTORNEY.

SYSTEM FOR SETTING TELECOMMUNICATION SWITCHES BY MARKING

Filed June 5, 1956

INVENTOR
CONSTANTIN PAPPAZOGLU
BY Paul M. Craig, Jr.
ATTORNEY.

May 31, 1960 C. PAPPAZOGLU 2,938,958

SYSTEM FOR SETTING TELECOMMUNICATION SWITCHES BY MARKING

Filed June 5, 1956 6 Sheets-Sheet 5

INVENTOR
CONSTANTIN PAPPAZOGLU
BY Paul M. Craig, Jr.
ATTORNEY

INVENTOR
CONSTANTIN PAPPAZOGLU
BY Paul M. Craig, Jr.
ATTORNEY

United States Patent Office 2,938,958

Patented May 31, 1960

2,938,958

SYSTEM FOR SETTING TELECOMMUNICATION SWITCHES BY MARKING

Constantin Pappazoglu, Bougival, France, assignor to Compagnie Industrielle des Telephones, Paris, France, a corporation of France Filed June 5, 1956, Ser. No. 589,449

Claims priority, application France June 22, 1955

10 Claims. (Cl. 179—18)

Figure 1:
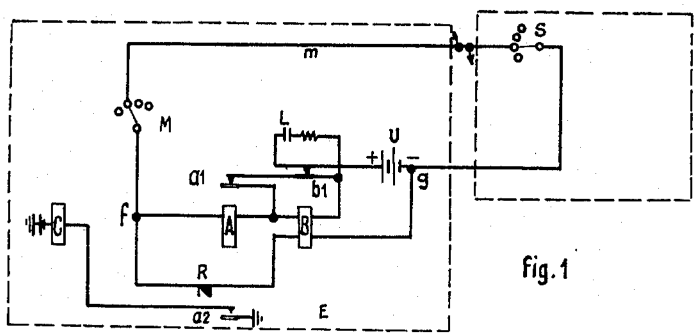

This invention relates to a device which may be used in automatic switching for telecommunications, that is, for telephony and telegraphy. This device will be described with reference to the accompanying drawings, which respectively show:

Fig. 1, a known device.

Figure 2:
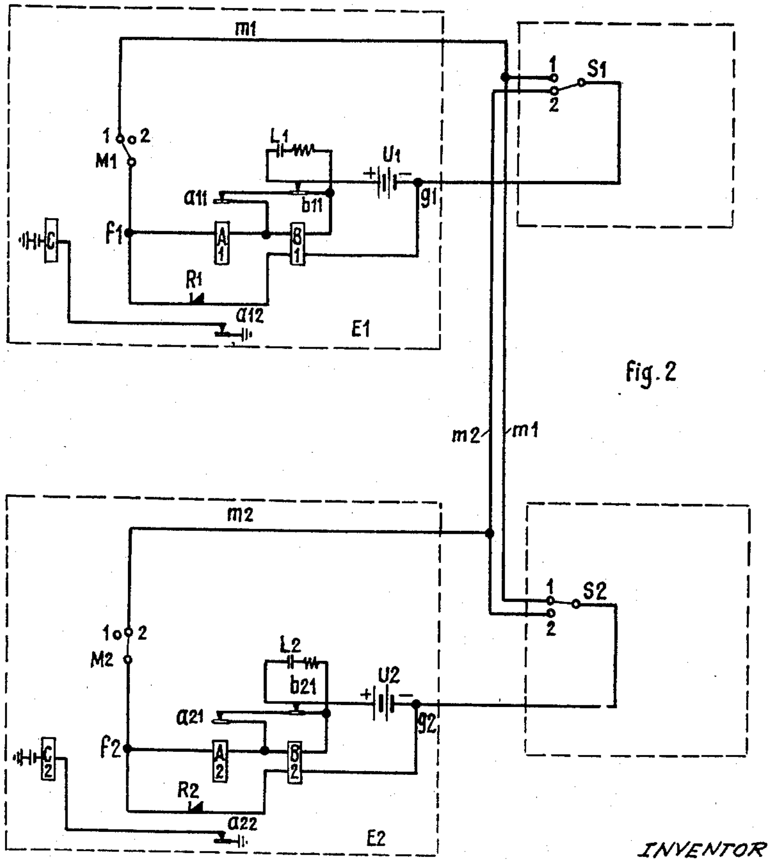

Fig. 2, a wrong circuit comprising two samples of this known device.

Figure 3:
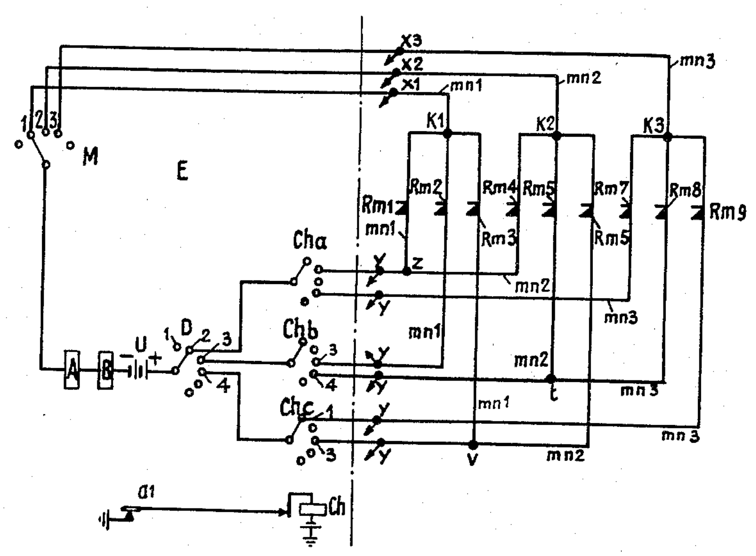

Fig. 3, a known system.

Figure 4:
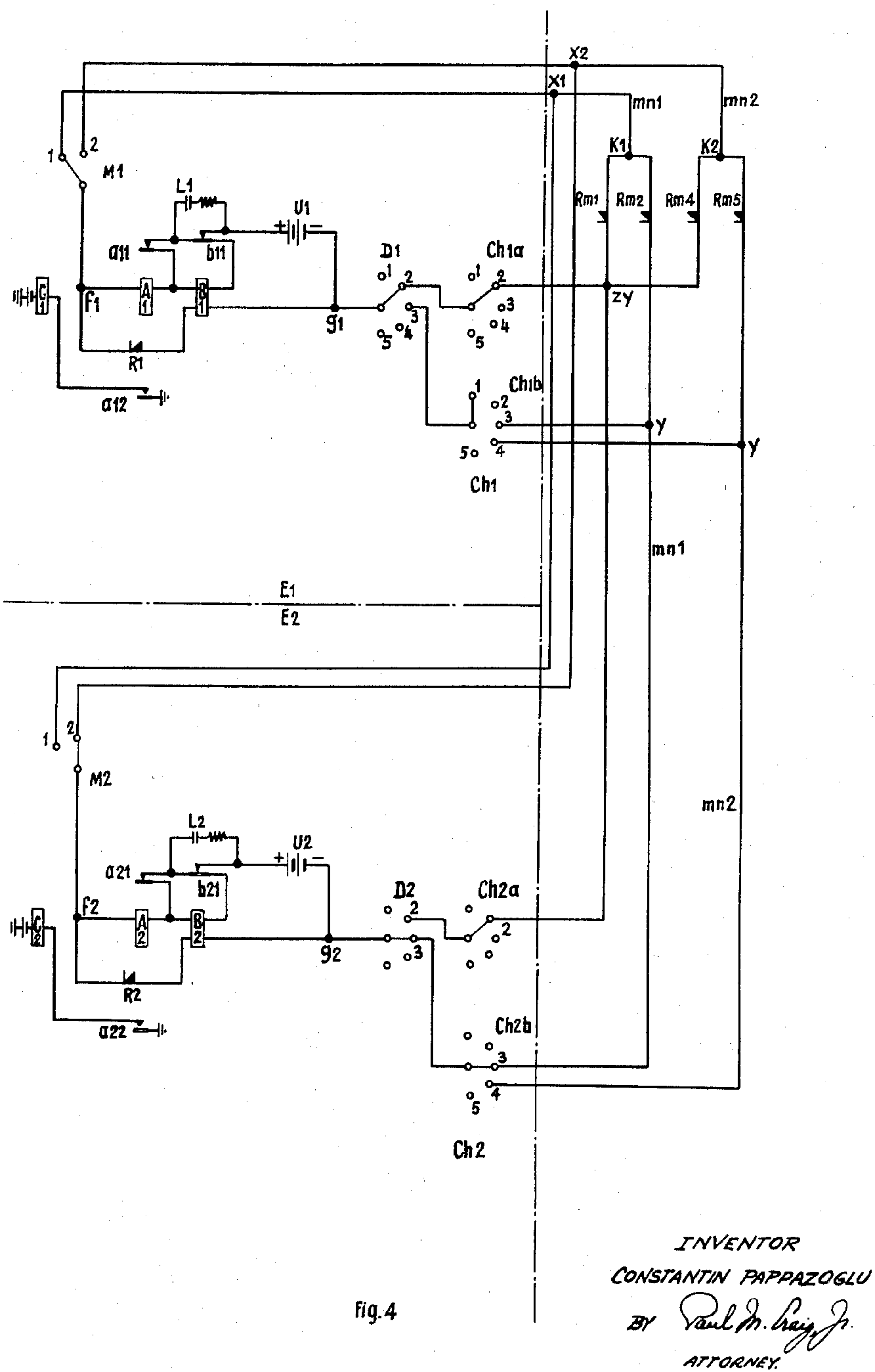

Fig. 4, a complex circuit in accordance with the known system according to Fig. 3 and comprising two identical samples of the known device according to Fig. 1.

Figure 5:
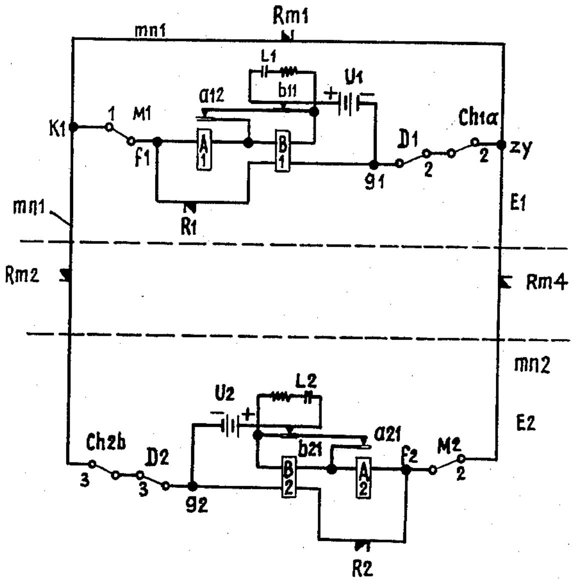

Fig. 5, the essential elements of the complex circuit of Fig. 4.

Figure 6:
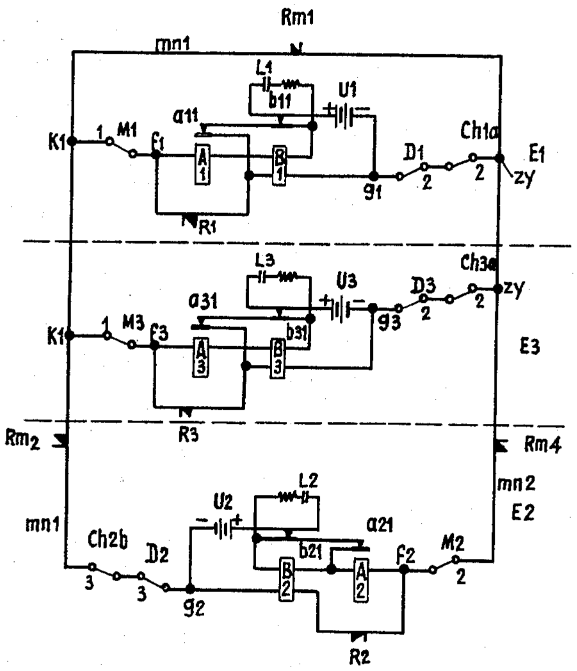

Fig. 6, the essential elements of a circuit still more complex than that of Fig. 5 and comprising three identical samples of the known device according to Fig. 1.

Figure 7:
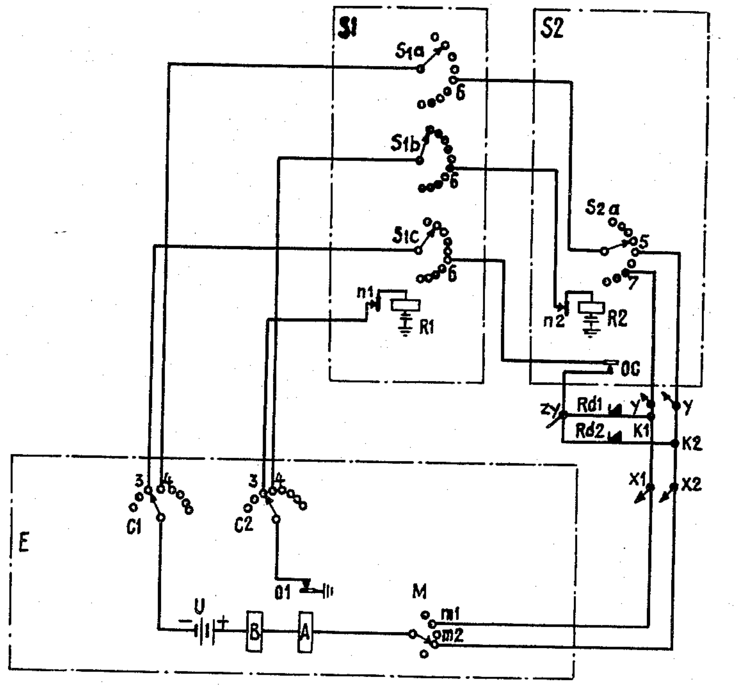

Fig. 7, another known system.

Figure 8:
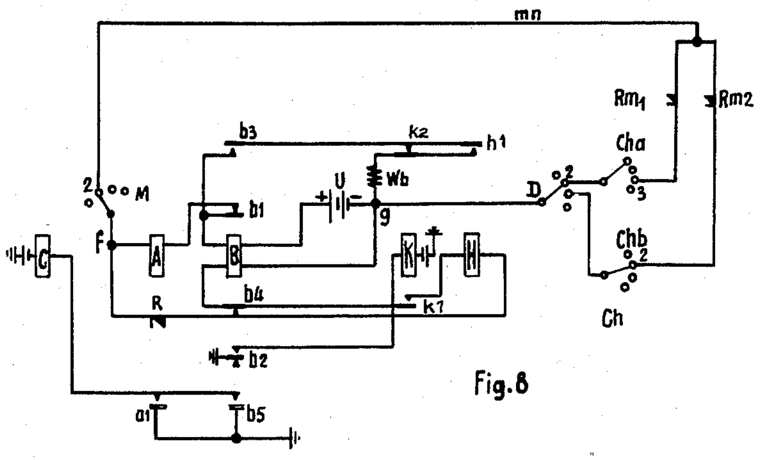

Fig. 8, an embodiment of the device according to the invention.

Figure 9:
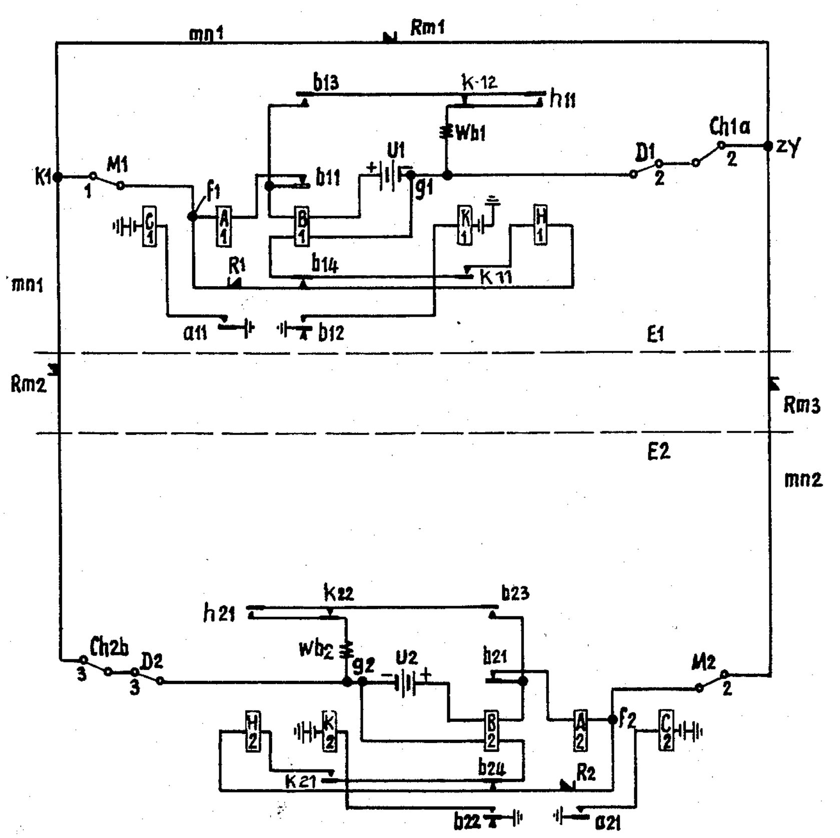

Fig. 9, a complex circuit which differs from that according to Fig. 5 only in that the known device according to Fig. 1 has been replaced by the new device according to Fig. 8.

Figure 10:
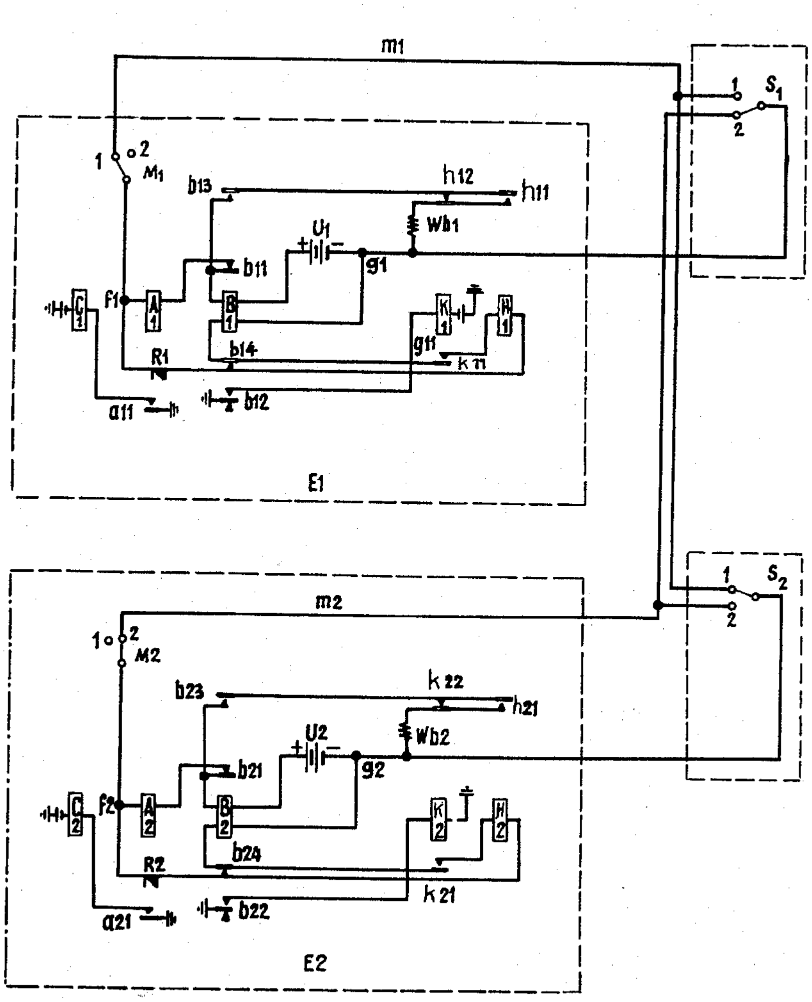

Fig. 10, a wrong circuit which differs from that according to Fig. 2 only in that the known device according to Fig. 1 is replaced by the new device according to Fig. 8.

In these different figures, a switch will generally be represented by one single wiper and by a few positions of the corresponding row of contacts.

The device according to the invention may be applied to the known system which will be hereinafter described with reference to Fig. 1.

This known system comprises registers E and selectors S belonging to different selection stages. Each one of the digits which make up the number of the called subscriber is registered on a switch M which is part of the register E and whose wipers assume a position which depends on the received digit. One such switch M only, which will be called "marker," will be considered in each register E. Again, except in Fig. 7, the selectors S of one selection stage only will be considered. Each register E contains an individual battery U, that is, a battery which has no point in common with the battery of any other register. The wiper of the marker M of any register E may be connected over a stopping relay A, the individual battery U and a finder, which has not been shown, with the wiper of any selector S. When a register E has thus been connected through this finder with a selector S, they constitute together a unit comprising a marker and a switch which is to be set in dependence on the position assumed by the marker of the same unit. The switch of this unit is set by marking, that is to say a wire *m*, called marking wire, connects a position of marker M with a position (or a group of positions) of switch S, and there are a plurality of such wires. Each of the marking wires *m* is multipled at one end to a marker M of all units and at its other end to all switches S, so that one and same marking wire is part of an electric circuit which permits of setting the switch S of any unit in dependence upon the position assumed by the marker M of the same unit. However, wrong connections, which will hereinafter be called cross-connections, and which will be described with reference to Fig. 2, may occur.

It has already been proposed, in order to avoid these cross-connections, to arrange in each register E the following device, illustrated by Fig. 1:

The stopping circuit comprises not only the individual battery U and the stopping relay A but also the back contact *b1* of a second relay B, which will be called discrimination relay. There is thus established in the idle condition, in register E, a first connnection comprising the individual battery U, the stopping relay A, the upper winding, which has a relatively low resistance, of the discrimination relay B and the back contact *b1* of this relay. In the idle condition, a second connection having the same extremities *f* and *g* as the first one is made up of the second winding (the lower winding in the figure), having a relatively high resistance, of the discrimination relay B and a current rectifier R so oriented that current generated by the individual battery U cannot flow through this second connection.

When there are no cross-connections, the only circuit to be considered is that shown by Fig. 1, and the device operates as follows: the discrimination relay B is fed over its upper winding and its back contact *b1* and vibrates over this contact, the current which flows through the stopping relay A is thus periodically interrupted but the discharge of condenser L, which contributes to keep relay A energized during the flow of the interrupted current, takes place through this relay during the opening of contact *b1*, and relay C, which is slow-operating, is finally energized over front contact *a2* of relay A. The operation of relay C, which will hereinafter be called confirmation relay, definitively stops selector S.

Fig. 2 shows two identical registers E1 and E2 and two identical selectors S1 and S2. The reference character which designates a member of a register E1 or E2 in Fig. 2 differs from that which designates it in Fig. 1 only by the addition of digit 1 for register E1 and digit 2 for register E2. Let it be first assumed that in each register the + pole of the battery is directly connected to the winding of relay A. Let it be also assumed that the marker M1 of the first register E1 has stopped on position 1 and that the marker M2 of the second register E2 has stopped on position 2. The wiper of marker M1 has been connected, over a finder which has not been shown, to the wiper of selector S1, which should therefore be set in position 1, which corresponds to position 1 of marker M1. Again, the wiper of marker M2 has been connected to the wiper of selector S2, which should therefore be set in position 2. Cross-connections may however take place according to the following wrong circuit, shown by Fig. 2: marker M1 in position 1, marking wire *m1*, selector S2 in position 1, — pole of battery U2, + pole of battery U2, stopping relay A2, marker M2 in position 2, marking wire *m2*, selector S1 in position 2, — pole of battery U1, + pole of battery U1 and finally stopping relay A1. Both stopping relays A1 and A2 operate simultaneously and stop selector S1 in position 2 and selector S2 in position 1 respectively, whereas selector S1 ought to have stopped in position 1 and selector S2 in position 2.

A similar wrong circuit may be established initially with the device actually shown by Fig. 2. The only difference is that in register E1 this circuit passes through back contact *b11* then in parallel through back contact

*a*11 and the upper winding of relay B1 and follows a similar path in register E2.

The device according to Fig. 1 allows of avoiding these cross-connections. It works as follows:

At a moment which very closely follows the closing of the initial wrong circuit traced above, one of contacts *b*11 and *b*21 is closed and the other open. Let it be assumed for instance that contact *b*11 is open and contact *b*21 closed. The circuit traced above is opened at *b*11 and battery U1 is therefore no longer in the circuit. The lower winding of B1 is fed by battery U2 and it appears that rectifier R1 allows of the flow of current through this winding. As this winding has a relatively high resistance it causes both relays A2 and B2, with which it is in circuit, to fall back. Neither confirmation relay C1 nor confirmation relay C2 operates, they do not confirm the stopping of selectors S1 and S2 on positions 2 and 1 respectively, these two selectors are therefore again set rotating and the initial wrong circuit is destroyed.

Any winding similar to the lower winding of relay B, whose resistance is so high that a relay in series therewith cannot be energized, will be called high-resistance winding in the following. The other windings will not be qualified in any way.

In the system of Fig. 3 as in that of Fig. 1 there is a plurality of units each of which comprises a marker and a switch which is to be set by marking in dependence on the position of the marker, and one and same plurality of marking wires serves to set the switch of any unit in dependence upon the position of the corresponding marker. As will appear from the following the marker bears the reference M and the switch the reference *Ch*.

In Fig. 3 the portion of the figure which is on the left of the vertical dot-and-dash line shows elements of a register E. U is its individual battery, A its stopping relay and B its discrimination relay. M is a marker which comprises for instance 10 rows of 100 positions each. It therefore comprises 1000 contacts as a whole. Each of these contacts is determined by the three digits of the code of a called exchange, so that each of the 1000 contacts of marker M may correspond to a given remote exchange selected among 1000 remote exchanges. Contact 1 of marker M is connected to a common point *k*1 by a marking wire *mn*1, which beyond common point *k*1 divides into three branches, still called *mn*1. The first one bears a rectifier R*m*1 and ends at a common point *z*, the second bears a rectifier R*m*2 and ends at contact 3 of a bank *Ch*2*b* of a finder *Ch*, the third bears a rectifier R*m*3 and ends at an other common point *v*. As shown by multiplying arrow *x*1 and three of the multipling arrows *y*, multipling points *k*1, *z* and *v* are common to all registers E, so that one single change effected in the end connections of that part of wire *mn*1 which is common to the whole installation suffices to change the elements of the automatic switching in the whole installation. Marking wires *mn*2 and *mn*3 similarly start from contacts 2 and 3 of marker M. Wire *mn*2 passes over common point *k*2, one of its branches ends at common point *z* and another at common point *v*. Wire *mn*3 passes over common point *k*3 and one of its branches ends at common point *t*. D is a distributor which occupies several successive positions which will be used in switching through the communication. Finder *Ch* will assume, for each position of distributor D, a position which will determine one characteristic of the communication to be switched through, for example the way in which taxation should be applied, the number of the selections to be effected, the amplitude of a selection. The same contact *k*1 serves to carry out three successive settings of finder *Ch*: in position 2 of distributor D, it would necessarily, if the register shown were alone, set the wiper *Ch* on its position 2 through a circuit passing over rectifier R*m*1; in position 3 of distributor D, it would set wiper *Chb* in position 3 through a circuit passing over rectifier R*m*2 and finally in position 4 of distributor D it would set wiper *Chc* in position 3 through a circuit passing over rectifier R*m*3. In particular, when marker M is in position 1 and distributor D in position 2, wiper *Cha* should stop in position 2 through a circuit passing over wire *mn*1 and rectifier R*m*1. Again, when marker M is in position 2 and distributor D in position 3, wiper *Chb* should stop in position 4 through a circuit passing over wire *mn*2 and rectifier R*m*5. Rectifiers, designated by references R*m*1 to R*m*9, carried by the different branches of the marking wires, are necessary to avoid wrong connections.

Figure 4 derives from Fig. 3, from which it differs in the following respects. It shows two registers E1 and E2; as in Fig. 2 and those which are to follow the two references which designate the corresponding elements of registers E1 and E2 differ from one another only in that the first comprises digit 1 and the second digit 2. Only the two marking wires *mn*1 and *mn*2, with two branches only for each of them, and the two corresponding rows *Ch*1*a*, *Ch*1*b*, *Ch*2*a*, *Ch*2*b* of the two finders *Ch*1 and *Ch*2 have been shown. The known device according to Fig. 1 has been shown in each of registers E1 and E2.

The figure shows wiper *Ch*1*a* in its right stopping position 2 which corresponds with marker M1 in position 1 and distributor D1 in position 2. The stopping circuit is as follows: +pole of U1, back contact *b*11, in parallel the back contact *a*11 of stopping relay A and the upper winding of discrimination relay B1, winding of stopping relay A1, common point *f*1, marker M1 in position 1, marking wire *mn*1, multipling point *x*1, common point *k*1, rectifier R*m*1, both common and multipling point *zy*, wiper *Ch*1*a* in position 2, distributor D1 in position 2, common point *g*1, —pole of U1.

The figure also shows the following second stopping circuit, shunted on the first one between common points *k*1 and *zy* and passing through register E2: + pole of U2, back contact *b*21, in parallel back contact *a*21 of stopping relay A2 and upper winding of discrimination relay B2, winding of stopping relay A2, common point *f*2, wiper of marker M2 in position 2, multipling point *x*2, marking wire *mn*2, common point *k*2, rectifier R*m*4, both common and multipling point *zy*, the right stopping circuit previously traced in register E1 to common point *k*1, rectifier R*m*2, multipling point *y*, wiper *Ch*2*b* in position 3, distributor D2 in position 3 and — pole of U2. A stopping circuit has thus been closed over the stopping relay A2 of register E2 when wiper *Ch*2*b* is in position 3 whereas, as has been mentioned above, wiper *Ch*2*b* ought to have stopped on position 4, since marker M2 is in position 2 and distributor D2 in position 3. Wiper *Ch*1*a* of a finder *Ch*1 has thus been stopped on its right position 2 and a wiper *Ch*2*b* of another finder *Ch*2 simultaneously stopped on a wrong position 3, whereas in the cross-connections of Fig. 2 both wipers S1 and S2 had been stopped on wrong positions.

Only the two circuits traced above of Fig. 4 and, in each of both registers E1 and E2, the known device shown by Fig. 1 have been shown in Fig. 5. The operation of this system will be explained hereinafter with reference to Fig. 5.

Both discrimination relays B1 and B2 vibrate as explained above, and a moment very soon arrives when one of the two contacts *b*11 and *b*21 is open and the other closed. If *b*11 is open and *b*21 closed battery U1 is by-passed, the current of battery U2, which cannot pass through rectifier R*m*1, entirely passes through the lower winding of B1, and the system work as has already been stated with reference to Fig. 2. But if it is *b*11 which is first closed and *b*21 which is open the lower winding of B2 is no longer energized by the current given by battery U1 because it is short-circuited by rectifier R*m*1, which has a much lower resistance and did not exist in the circuit shown by Fig. 2.

It is in practice impossible to give the windings of stopping relays A1 and A2, the two lower windings of discrimination relays B1 and B2 and rectifier Rm1 such values that the known device according to Fig. 1 may work satisfactorily. One only (E2) of the two registers E1 and E2 can therefore detect the cross-connection, and the time necessary to detect it in increased. Moreover, as in Fig. 2, none of the two confirmation relays C1 and C2 (which have not been shown in Fig. 5) is operated and finder Ch1a of register E1 therefore goes on rotating, as does finder Ch2b of register E2, although it has stopped on the right position 2.

Figure 6 is similar to Fig. 5, but shows elements belonging to three registers E1, E2 and E3 instead of two only. The two references k1 in fact designate one single common point only and this also applies to both references zy. The same wrong circuit, passing through register E2, as in Figs. 4 and 5, is shunted on the right circuits passing through registers E1 and E3. It can here be detected only when contact b21 of relay B2 is closed while contacts b11 and b31 of relays B1 and B3 are open, which may still longer delay the operation of the discriminating device able to detect the wrong circuit. Relay A2 should moreover be able to release when a current much higher than in the case of Fig. 5 flows therethrough, since it is connected in series with the lower windings in parallel of both relays B1 and B3 instead of the lower winding of relay B1 only. This renders difficult the design of relay A2, that is, the stopping relays of the individual registers. These several difficulties still increase if the number of registers exceeds three.

Fig. 7 shows a system in which the marking wires, two of which have been shown at m1 and m2, are common to two selection stages. As will appear from the following the switch to be set in dependence on the position assumed by the marker which belongs to the same unit as the switch is here a second-stage selector, and this unit comprises, besides the marker and the second-stage selector, the first-stage selector through which the second-stage selector has been connected to the marker. The marking wires m1, m2, etc. serve to set the second-stage selector of any unit in dependence on the position of the marker M of this unit.

References E, U, A, B and M have the same meaning as formerly. S1 is a first-stage selector, R1 is its driving magnet, S1a, S1b and S1c are its banks. S2 is a second-stage selector, R2 is its driving magnet and S2a one of its banks.

C1 and C2 are two banks of a sequence switch which belongs to register E; selection at the S1-stage takes place in position 3 of the sequence switch and selection at the S2-stage in position 4 of the sequence switch.

OC is the back contact of a relay which is energized when selector S2 is busy or when all the connectors to which it gives access through other banks not shown are busy. Rd1 and Rd2 are rectifiers.

It is assumed that marker M is in position 2.

Wire m2 is multipled at x2 to all registers E, at zy, which is both a common and a multipling point, and at y to all selectors S2.

The operation is as follows:

In position 3 of the sequence switch magnet R1 is energized through: ground, contact a1, position 3 of C2, interrupter contact n1, magnet R1 and battery.

When S1c reaches position 6 the marking circuit is closed over: + pole of U, relays B and A in series, wiper and contact of marker M, wire m2, common point k2, rectifier Rd2, both common and multipling point zy, contact OC, position 6 of S1c, wiper S1c, position 3 of C1, wiper C1 and — pole of U.

Relay A then stops the rotation of R1, the sequence switch steps to position 4 and relay A is released.

R2 again begins rotating through: ground, contact a1, position 4 of C2, position 6 of S1b, interrupter contact n2, magnet R2 and battery.

When S2 reaches position 5, the marking circuit is closed: + pole of U, relays B and A in series, wiper and contact of marker M, wire m2, common point k2, position 5 of S2a, position 6 of S1a, position 4 of C1 and — pole of U.

Relay A operates and stops the rotation of R2.

On account of the common and multipling points the following shunt may here be branched, in parallel with rectifier Rd2, between common point k2 and point zy, on the right circuit traced above which has allowed of setting selector S1: wiper S2a, in position 5, of a selector S2 not shown, wiper S1a, in position 6, of a selector S1 not shown, wiper C1, in position 4, of the sequence switch of a register E not shown, battery U and relays B and A of this register, the wiper of the marker M of this register, wire m1, common point k1 and rectifier Rd1. Selector S2 will thus have stopped on position 5, which corresponds to the position of marker M to which wire m2 is connected, whereas it ought to have stopped on position 7, which corresponds to the position of marker M to which wire m1 is connected. The wrong connection is of the same type as that shown by Fig. 4, and the present invention, which will now be explained, may therefore be applied as well to the system illustrated by Fig. 7 as to the system illustrated by Fig. 3.

This invention relates to a device which improves the known device according to Fig. 1, keeping the following elements of this device: in the idle condition, in each register E, a first connection comprising an individual battery U, a first (upper) winding of a discrimination relay B, a back contact b1 of this relay and the winding of a stopping relay A which remains energized while the discrimination relay B vibrates on its back contact b1, and a second connection having the same ends f and g as the first and comprising a second (lower) winding of the discrimination relay B and a rectifier R.

According to the invention the second (lower) winding of the discrimination relay B has a low resistance and the energization of this relay B over this second winding results in this low resistance of the above mentioned second connection being replaced by a high resistance in another connection which includes the low resistance second (lower) winding of relay B.

Owing to the fact that the high resistance of the lower winding of relay B2 of the known device shown by Fig. 5 has been replaced by a low resistance, this relay B2 can be completely energized by battery U1 in spite of the presence of rectifier Rm1. When this low resistance is replaced later by a high resistance the same circumstances as in the known device will be restored again.

Fig. 8 shows an embodiment of the device according to the invention which presents, besides the characteristic which has just been stated, other characteristics, especially that one which will be stated later with respect to Fig. 10.

Let it be first assumed that the device according to Fig. 8 is alone, that is, there is no multipling, marker M has stopped on its position 2 as shown, distributor D has stopped in position 2, also as shown, and finder Ch is caused to rotate, hunting for position 2 occupied by marker M. When finder Ch reaches position 3, the following circuit will be closed: + pole of U, upper winding of B, back contact b1 winding of A, common point f, marker M in position 2, marking wire mn, rectifier Rm1 in the direction of flow, wiper Cha of finder Ch in position 3, distributor D in position 2, common point g, — pole of U. Relay B vibrates on its back contact b1, relay A remains energized during this vibration, its contact a1 closes and confirmation relay C, which is slow to operate, is finally energized. It definitely cuts the rotation circuit of finder Ch, which remains on its right position 3. Relay B has not completely energized during its vibration, its contact b3 has therefore not closed, and its holding circuit shown: + pole of U, upper winding of B, *b*3, *g*2, W*b*, *g*, — pole of U, has not closed. Again contact *b*4 has not opened, front contact *b*2 has not closed and the relays shown K and H, which will hereinafter be called "auxiliary relays," have therefore not operated.

Fig. 9 will now be considered. As has already been stated with respect to Fig. 4, a right circuit is closed in register E1 and a wrong circuit through registers E1 and E2. These two circuits are designated in Fig. 9 by the same references as in Figs. 4 and 5, except that in Fig. 9 the circuit goes directly from contact *b*11 to the winding of relay A1 and of course similarly directly from contact *b*21 to the winding of relay A2.

Contacts *b*11 and *b*21 here again simultaneously vibrate and a moment very soon comes when one of the contacts is open and the other closed.

Let it first be assumed that contact *b*11 is closed and contact *b*21 open. Although the current provided by battery U1 can pass through rectifier R*m*1, it causes relay B2 to energize over its lower winding because the resistance of this winding is low. As in the known device according to Figs. 1 and 2, relay B2 is completely energized over its lower winding and contact *b*21 is definitively opened. But here contact *b*24 is opened, front contacts *b*22 and *b*23 are closed and relay B2 is thus provided with a holding circuit through its upper winding, *b*23, *k*22, resistance W*b*2 and battery U2. Relay K2 is energized over *b*22. High-resistance relay H2 is put in series over *k*21 with the lower winding of relay B2. The holding circuit of relay B2, which formerly passed over back contact *k*22, now passes over front contact *h*21. Relay A2, whose circuit is definitively opened at *b*21, falls back. The operation of relays A1 and B1 of register E1 remains that stated for relays A and B of Fig. 8 in a right circuit, since A1 and B1 are energized, in the manner which has been stated for Fig. 8, in a circuit which passes over rectifier R*m*1, the resistance of which is low with respect to that of the winding of H2, shunted on R*m*1.

Rectifiers R*m*1, R*m*2 and R*m*3 are identical. If their resistances in the direction of flow is too low, an additional resistance is mounted in series with each of them. For instance, if the sum of the resistance of each rectifier in the direction of flow and of its additional resistance is equal to the resistance of the lower winding of relay B2, about one fourth of the current output of source U1 will flow through this winding, whereas the remaining three fourths will flow through rectifier R*m*1.

Let it now be assumed that it is vibrating contact *b*11 which is opened and contact *b*21 which is closed. In this case the wrong circuit passes over the lower winding of relay B1, back contact *b*14 and rectifier R1. The circuit is fed solely by battery U2. The current cannot flow through rectifier R*m*1, which is no longer in the direction of flow, and therefore entirely flows through the lower winding of relay B1. The latter is completely energized, relay A2, whose circuit is opened at *b*14, falls back, relay G1, and afterwards high-resistance relay H1 are energized, and relay A2, connected in series with high-resistance relay H1, cannot be re-energized. Relay A1 also falls back, since its circuit is opened at *b*11, but it is sufficient, in order to cause confirmation relay C1 to energize, to control it not only by stopping relay A1, but also by discrimination relay B1 which remains energized through its holding circuit. This is what is shown by Fig. 8, in which the circuit of confirmation relay C can be closed by either of contacts *a*1 and *b*5.

Since confirmation relay C2 is not energized wiper C*h*2*b* leaves its position 3, the wrong circuit traced above is opened, relay H1 falls back, it opens at *h*11 the holding circuit of relay B1, the latter also falls back and opens at *b*12 the circuit of relay K1, which also falls back. The right circuit of relay A1 through register E1 only is restored at *b*11 so that confirmation relay C1 may operate and keep finder C*h*1 on its right position 2.

If it is assumed, as in Fig. 6, that there are three registers E1, E2 and E3 and that wiper C*h*2*b* of register E2 is in a wrong position, it is apparent that the lower winding of the discrimination relay B2 of this register is still better fed than in the case of Fig. 9.

In the cross-connections shown in Fig. 10, the device operates as already explained with respect to Fig. 9.

In the circuit shown by Fig. 2, if it is for instance assumed that contact *b*11 opens while contact *b*21 is still closed, battery U2 first serves to charge condenser L1. It is only later that it feeds the lower winding of relay B1, the operation of which is thereby delayed.

According to a characteristic of the invention which is independent of that hereinabove defined, the second connection mentioned above between common points *f*1 and *g*1 (Fig. 2) passes over a back contact of discrimination relay B1.

The operation of discrimination relay is thus speeded up. The swift opening of the back contact of this relay again results in the swift release of the stopping relay A2 of the other register E2. Relay B1 may have a holding circuit which prevents it from releasing and relay A2 from being re-energized.

It has been seen above that the device according to Fig 8 is already provided with the characteristic mentioned above, and that the back contact mentioned above is contact *b*4.

In Fig. 10 the wrong circuit resulting from cross-connections is that which is designated by the same references as the wrong circuit of Fig. 2 which has been traced hereinbefore. In this circuit the lower winding of B1 may have a high resistance, as in the known device according to Fig. 1 and in contradistinction to the device used in Fig. 9, because here there is no longer a short-circuit through a low-resistance rectifier R*m*1. Relay F1 can therefore have a low resistance. In other respects the system works in the same manner as in Fig. 9. If it is for instance assumed that *b*11 is open and *b*21 closed, relay B1 is completely energized, it inserts F1 in series with itself, A2 falls back, C2 is not energized, selector S2 starts again and the cross-connections are destroyed.

I claim:

1. In an automatic switching system: a plurality of units each of which comprises a marker having a wiper and a switch having a wiper and to be set in dependence on the position of said marker; marking wires each of which is, at one end, multipled to a position of each of the markers and at its other end to a position of each of the switches so that each marking wire is a part of the electric circuit through which the switch of any said unit may be set; and in each said unit the following elements: a stopping relay having a low-resistance winding; a discrimination relay having a first low-resistance winding and a second low-resistance winding; a first low-resistance connection comprising an individual battery, said first winding of said discrimination relay, a back contact of said discrimination relay and said winding of said stopping relay, said stopping relay being so slow releasing as to remain operated while said discrimination relay vibrates on its back contact; a second low-resistance connection having the same ends as the first and comprising said second winding of said discrimination relay and a rectifier; means responsive to the actuation of said discrimination relay over said second winding for replacing said second low-resistance connection by a high-resistance connection having the same ends as said first and second low-resistance connections; a connection between one of said two ends common to said three connections and said marker wiper; and a connection between the other end common to said three connections and said wiper of said switch.

2. An automatic switching system according to claim 1, in which said high-resistance connection comprises said second low-resistance winding of said discrimination relay.

3. An automatic switching system according to claim 2, in which said means for replacing said second low-resistance connection by said high-resistance connection comprise an auxiliary relay, means responsive to the operating of said discrimination relay through its second winding for energizing said auxiliary relay, and a front contact of said auxiliary relay over which passes said high-resistance connection.

4. In an automatic switching system: a plurality of units each of which comprises a marker having a wiper and a switch having a wiper and to be set in dependence on the position of said marker; marking wires each of which is, at one end, multipled to a position of each of the markers and at its other end to a position of each of the switches so that each marking wire is a part of the electric circuit through which the switch of any said unit may be set; and in each said unit the following elements: a stopping relay having a low-resistance winding; a discrimination relay having a first low-resistance winding and a second winding; a first connection comprising an individual battery, said first winding of said discrimination relay, a back contact of said discrimination relay and said winding of said stopping relay, said stopping relay being so slow releasing as to remain operated while said discrimination relay vibrates on its back contact; a second connection having the same ends as the first, comprising said second winding of said discrimination relay and a rectifier and passing over a second back contact of said discrimination relay; a connection between one of the two ends common to both connections and said marker wiper; and a connection between the other end common to both connections and said wiper of said switch.

5. In an automatic switching system: a plurality of units each of which comprises a marker having a wiper and a switch having a wiper and to be set in dependence on the position of said marker; marking wires each of which is, at one end, multipled to a position of each of the markers and at its other end to a position of each of the switches so that each marking wire is a part of the electric circuit through which the switch of any said unit may be set; and in each said unit the following elements: a stopping relay having a low-resistance winding; a discrimination relay having a first low-resistance winding and a second winding; a first connection comprising an individual battery, said first winding of said discrimination relay, a back contact of said discrimination relay and said winding of said stopping relay, said stopping relay being so slow releasing as to remain operated while said discrimination relay vibrates on its back contact; a second connection having the same ends as the first and comprising said second winding of said discrimination relay and a rectifier; a holding circuit for said discrimination relay which passes over a front contact of said relay which is only closed when said relay is operated through said second winding; a connection between one of said two ends common to said both connections and said marker wiper; and a connection between the other end common to both connections and said wiper of said switch.

6. An automatic switching system according to claim 5, in which said holding circuit of said discrimination relay comprises said first winding of said relay.

7. An automatic switching system according to claim 5, in which said holding circuit of said discrimination relay comprises said individual battery.

8. In an automatic switching system: a plurality of units each of which comprises a marker having a wiper and a switch having a wiper and to be set in dependence on the position of said marker; marking wires each of which is, at one end, multipled to a position of each of the markers and at its other end to a position of each of the switches so that each marking wire is a part of the electric circuit through which the switch of any said unit may be set; and in each said unit the following elements: a stopping relay having a low-resistance winding; a discrimination relay having a first low-resistance winding and a second low-resistance winding; a first low-resistance connection comprising an individual battery, said first winding of said discrimination relay, a back contact of said discrimination relay and said winding of said stopping relay, said stopping relay being so slow releasing as to remain operated while said discrimination relay vibrates on its back contact; a second low-resistance connection having the same ends as the first and comprising said second winding of said discrimination relay and a rectifier; an auxiliary relay; a holding circuit for said discrimination relay which passes over a front contact of said discriminating relay, which is only closed when said discrimination relay is operated through its second winding, and over a back contact of said auxiliary relay; means responsive to the actuation of said discrimination relay over said second winding for actuating said auxiliary relay; means responsive to the actuation of said auxiliary relay for replacing said second low-resistance connection by a high-resistance connection having the same ends as said first and second low-resistance connections; a connection between one of the two ends common to said three connections and said marker wiper; and a connection between the other end common to said three connections and said wiper of said switch.

9. In an automatic switching system: a plurality of units each of which comprises a marker having a wiper and a switch having a wiper and to be set in dependence on the position of said marker; marking wires each of which is, at one end, multipled to a position of each of the markers and at its other end to a position of each of the switches so that each marking wire is a part of the electric circuit through which the switch of any said unit may be set; and in each said unit the following elements: a stopping relay having a low-resistance winding; a discrimination relay having a first low-resistance winding and a second winding; an auxiliary relay; a first connection comprising an individual battery, said first winding of said discrimination relay, a back contact of said discrimination relay and said winding of said stopping relay, said stopping relay being so slow releasing as to remain operated while said discrimination relay vibrates on its back contact; a second connection having the same ends as the first and comprising said second winding of said discrimination relay and a rectifier; means responsive to the actuation of said discrimination relay over its second winding for energizing said auxiliary relay; a holding circuit for said discrimination relay comprising a front contact of said auxiliary relay; a connection between one of said two ends common to said two connections and said marker wiper; and a connection between the other end common to said two connections and said wiper of said switch.

10. In an automatic switching system: a plurality of units each of which comprises a marker having a wiper and a switch having a wiper and to be set in dependence on the position of said marker; marking wires each of which is, at one end, multipled to a position of each of the markers and at its other end to a position of each of the switches so that each marking wire is a part of the electric circuit through which the switch of any said unit may be set; and in each said unit the following elements: a stopping relay having a low-resistance winding; a slow-operating confirmation relay; a discrimination relay having a first low-resistance winding and a second winding; a first low-resistance connection comprising an individual battery, said first winding of said discrimination relay, a back contact of said discrimination relay and said winding of said stopping relay, said stopping relay being so slow releasing as to remain operated while said discrimination relay vibrates on its back contact; a second connection having the same ends as the first and comprising said second winding of said discrimination relay and a rectifier; means responsive to the actuation of said stopping relay or of said discrimination relay over said second winding for actuating said confirmation relay; a connection between one of said two ends common to said two connections and said marker wiper; and a connection between the other end common to said two connections and said wiper of said switch.

References Cited in the file of this patent

UNITED STATES PATENTS

| | | |
|---|---|---|
| 2,673,246 | Lesigne | Mar. 23, 1954 |
| 2,693,504 | Buchner | Nov. 2, 1954 |
| 2,697,751 | Buchner | Dec. 21, 1954 |
| 2,697,752 | Buchner | Dec. 21, 1954 |